(12) United States Patent
Takeda et al.

(10) Patent No.: US 8,237,868 B2
(45) Date of Patent: Aug. 7, 2012

(54) SYSTEMS AND METHODS FOR ADAPTIVE SPATIO-TEMPORAL FILTERING FOR IMAGE AND VIDEO UPSCALING, DENOISING AND SHARPENING

(75) Inventors: Hiroyuki Takeda, Santa Cruz, CA (US); Petrus J. L. Van Beek, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 685 days.

(21) Appl. No.: 12/414,524

(22) Filed: Mar. 30, 2009

(65) Prior Publication Data

US 2010/0245670 A1 Sep. 30, 2010

(51) Int. Cl.
*H04N 5/21* (2006.01)
*H04N 1/409* (2006.01)

(52) U.S. Cl. ........ 348/701; 348/607; 348/699; 348/620; 348/625

(58) Field of Classification Search .................. 348/607, 348/620, 625, 627, 699, 701; 375/240.27, 375/240.29; 382/275, 298
See application file for complete search history.

(56) References Cited

U.S. PATENT DOCUMENTS

| | | | |
|---|---|---|---|
| 6,178,205 B1 | 1/2001 | Cheung et al. | |
| 6,281,942 B1 | 8/2001 | Wang | |
| 7,075,580 B2 | 7/2006 | Jiang | |
| 7,199,838 B2 | 4/2007 | Lin et al. | |
| 7,330,218 B2 | 2/2008 | Lin et al. | |
| 7,418,149 B2 | 8/2008 | Dinh et al. | |
| 7,428,020 B2 | 9/2008 | Lin | |
| 7,889,950 B2 * | 2/2011 | Milanfar et al. | 382/300 |
| 2005/0280739 A1 | 12/2005 | Lin et al. | |
| 2006/0050783 A1 | 3/2006 | Le Dinh et al. | |
| 2006/0056724 A1 | 3/2006 | Le Dinh et al. | |
| 2006/0139494 A1 | 6/2006 | Zhou et al. | |
| 2006/0158562 A1 | 7/2006 | Rhee | |
| 2007/0047838 A1 | 3/2007 | Milanfar et al. | |
| 2007/0195199 A1 | 8/2007 | Chen et al. | |
| 2008/0204600 A1 | 8/2008 | Xu et al. | |
| 2008/0273119 A1 | 11/2008 | Yang et al. | |

FOREIGN PATENT DOCUMENTS

| | | |
|---|---|---|
| WO | 97/39572 | 10/1997 |
| WO | 2006/010275 | 2/2006 |

* cited by examiner

*Primary Examiner* — Jefferey Harold
*Assistant Examiner* — Jean W Desir
(74) *Attorney, Agent, or Firm* — Austin Rapp & Hardman

(57) ABSTRACT

A method for adaptive spatio-temporal filtering is disclosed. Local motion vectors between a current video frame and other nearby video frames are determined. Local motion-aligned temporal confidence parameters are determined. Local spatial orientation parameters are determined. The local motion vectors, the local motion-aligned temporal confidence parameters, and the local spatial orientation parameters are used to adaptively determine spatio-temporal kernel weights. The spatio-temporal kernel weights are used to perform spatio-temporal filtering on input video data.

19 Claims, 8 Drawing Sheets

| $p$ | $\gamma$ | $\sigma(p)$ | $\theta(p)$ | $c_{11}(p)$ | $c_{12}(p)$ | $c_{22}(p)$ |
|---|---|---|---|---|---|---|
| 1 | 1.0000 | 1.5000 | $-\frac{4}{8}\pi$ | 0.6667 | -0.0000 | 1.5000 |
| 2 | 1.0000 | 1.5000 | $-\frac{5}{8}\pi$ | 0.7887 | 0.2946 | 1.3780 |
| 3 | 1.0000 | 1.5000 | $-\frac{6}{8}\pi$ | 1.0833 | 0.4167 | 1.0833 |
| 4 | 1.0000 | 1.5000 | $-\frac{7}{8}\pi$ | 1.3780 | 0.2946 | 0.7887 |
| 5 | 1.0000 | 2.0000 | 0 | 2.0000 | 0 | 0.5000 |
| 6 | 1.0000 | 2.0000 | $\frac{1}{8}\pi$ | 1.7803 | -0.5303 | 0.7197 |
| 7 | 1.0000 | 2.0000 | $\frac{2}{8}\pi$ | 1.2500 | -0.7500 | 1.2500 |
| 8 | 1.0000 | 2.0000 | $\frac{3}{8}\pi$ | 0.7197 | -0.5303 | 1.7803 |
| 9 | 1.0000 | 2.0000 | $\frac{4}{8}\pi$ | 0.5000 | -0.0000 | 2.0000 |
| ... | | | | | | ... |

SYSTEMS AND METHODS FOR ADAPTIVE SPATIO-TEMPORAL FILTERING FOR IMAGE AND VIDEO UPSCALING, DENOISING AND SHARPENING

TECHNICAL FIELD

The present disclosure relates generally to computers and computer-related technology. More specifically, the present disclosure relates to a framework for processing video signals, i.e., digital image sequences.

BACKGROUND

Currently, very high resolution flat-panel display devices are being developed and brought to market. One example is liquid crystal display (LCD) devices with 4K×2K resolution (2160 lines and 4096 pixels/line). Such display devices are exceeding the highest spatial resolution of video content commonly available, namely 1080p high definition video (1080 lines and 1920 pixels/line). Thus, it may be desirable to use image and video upscaling or spatial format conversion methods in such display devices.

Recent display devices may also be capable of and benefit from higher frame rates or increased temporal resolution, such as 50, 60, 72, 96 or 120 frames per second. Again, such very high frame rates may exceed the highest frame rate of video content commonly available (24, 25, 30, 50 or 60 frames per second). This highlights the usefulness of temporal video upscaling or temporal video frame rate conversion methods.

Generally, the goals in achieving video interpolation and reconstruction are to enhance or increase the resolution of the input video in a manner that is visually pleasing and artifact-free. Common visual artifacts that may occur in spatial upscaling are edge jaggyness, ringing on edge contours, blurring of edges and blurring of texture detail. Common visual artifacts that may occur in temporal upscaling are motion blur, judder, temporal instability and other motion artifacts. In addition, the input video often may already contain artifacts, for example due to coding and compression or due to other processing stages generally preceding the final processing for display. Therefore, another goal is to avoid amplifying such artifacts in the input signal, and possibly to remove such artifacts.

Due to changing viewing conditions (e.g., closer viewing distances, darker surroundings), as well as incorporation of new display technologies (e.g., higher brightness, wider color gamut) in modern flat-panel display devices, any artifacts in the input video as well as any additional artifacts that may be introduced by the scaling or conversion method used are becoming more visible than in the past. This highlights the usefulness of high-quality scaling and format conversion methods as well as other video processing methods, such as noise suppression.

BRIEF DESCRIPTION OF THE DRAWINGS

FIG. 4 illustrates an example of a codebook for storing combinations of quantized steering parameters;

DETAILED DESCRIPTION

Figure 1:
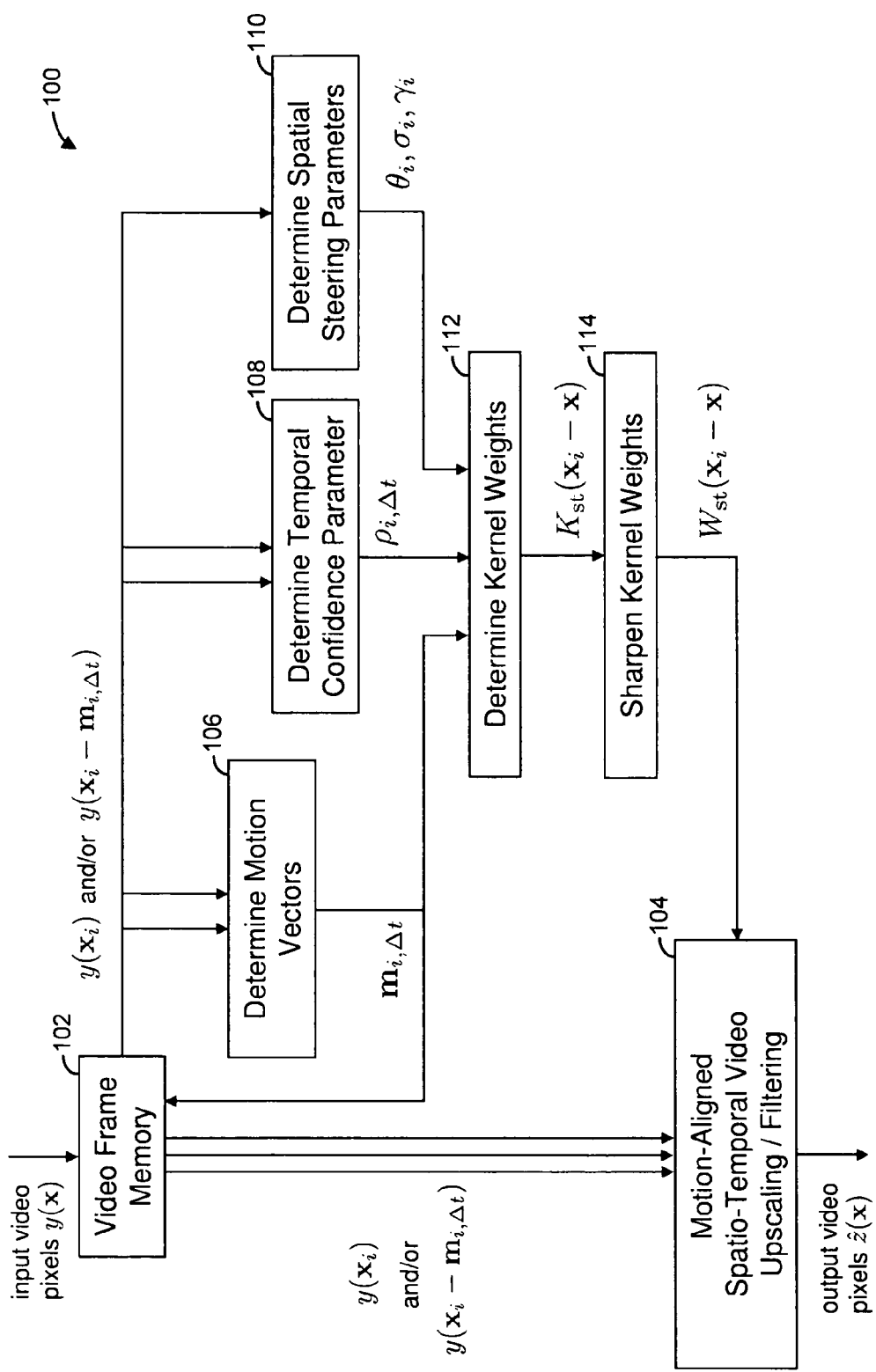
FIG. 1 illustrates a method for adaptive spatio-temporal filtering.

A method for adaptive spatio-temporal filtering is disclosed. In accordance with the method, local motion vectors between a current video frame and other nearby video frames are determined. Local temporal confidence parameters are determined. Local spatial steering parameters are determined. The local motion vectors, the local temporal confidence parameters, and the local spatial steering parameters are used to adaptively determine spatio-temporal kernel weights. The spatio-temporal kernel weights are used to perform spatio-temporal filtering on input video data.

The spatio-temporal filtering may involve upscaling the input video data. Alternatively, or in addition, the spatio-temporal filtering may involve denoising the input video data. Alternatively, or in addition, the spatio-temporal filtering may involve sharpening the input video data.

In accordance with the method, sets of discretized parameter values may be defined. The local motion vectors, the local temporal confidence parameters, and the local spatial steering parameters may be determined from the sets of discretized parameter values. The spatio-temporal kernel weights may be determined from a look-up table.

The local spatial steering parameters may include a scaling parameter. Determining the scaling parameter may involve: determining local spatial image gradients based on the current video frame, determining gradient covariance coefficients based on the local spatial image gradients, determining the scaling parameter from the gradient covariance coefficients, and applying scalar quantization to the scaling parameter.

The local spatial steering parameters may include an orientation angle parameter and an elongation parameter. Determining the orientation angle parameter and the elongation parameter may involve: defining combinations of quantized orientation angle parameters and quantized elongation parameters, determining gradient covariance coefficients for the combinations of quantized orientation angle parameters and quantized elongation parameters, determining local spatial image gradients based on a current video frame, determining gradient covariance coefficients based on the local spatial image gradients, and determining a combination of a quantized orientation angle parameter and a quantized elongation parameter whose gradient covariance coefficients are nearest to the image-derived gradient covariance coefficients.

Determining the local temporal confidence parameters may involve determining the correlation between candidate pixels in reference video frames and pixels that are being estimated in the current video frame. In addition, a pre-smoothing filter may be applied.

As mentioned, the method may involve adaptively determine spatio-temporal kernel weights. Adaptively determining the spatio-temporal kernel weights may involve defining three-dimensional spatio-temporal kernel weights based on a two-dimensional spatial kernel and a one-dimensional temporal kernel.

In accordance with the method, the spatio-temporal kernel weights may be modified. Modifying the spatio-temporal kernel weights may involve sharpening the spatio-temporal kernel weights. Sharpening the spatio-temporal kernel weights may involve convolving the spatio-temporal kernel weights with a kernel, multiplying the result of the convolution operation by a sharpening factor, and adding the result of the multiplication operation to the original spatio-temporal kernel weights. The sharpening factor may be selected based on local image gradients.

As mentioned, in accordance with the method, local motion vectors between a current video frame and other nearby video frames are determined. The nearby video frames may include reference video frames that are temporally positioned before as well as following the current video frame. Also, in accordance with the method, processing may be performed in a block-based manner.

A computer system that is configured to perform adaptive spatio-temporal filtering is also disclosed. The computer system includes a processor and memory in electronic communication with the processor. Instructions are stored in the memory. The instructions are executable to determine local motion vectors between a current video frame and other nearby video frames. The instructions are also executable to determine local temporal confidence parameters. The instructions are also executable to determine local spatial steering parameters. The instructions are also executable to use the local motion vectors, the local temporal confidence parameters, and the local spatial steering parameters to adaptively determine spatio-temporal kernel weights. The instructions are also executable to use the spatio-temporal kernel weights to perform spatio-temporal filtering on input video data.

Also disclosed is a computer-readable storage medium including instructions that, when executed by a processor, cause a computing device to determine local motion vectors between a current video frame and other nearby video frames. The instructions are also executable to determine local temporal confidence parameters. The instructions are also executable to determine local spatial steering parameters. The instructions are also executable to use the local motion vectors, the local temporal confidence parameters, and the local spatial steering parameters to adaptively determine spatio-temporal kernel weights. The instructions are also executable to use the spatio-temporal kernel weights to perform spatio-temporal filtering on input video data.

The methods disclosed herein relate to interpolation and denoising of motion video signals, i.e. digital image sequences of dynamic scenes. The methods disclosed herein utilize a multi-frame approach, i.e. multiple low resolution (LR) input video frames are utilized to reconstruct a single high resolution (HR) output video frame. Furthermore, the methods disclosed herein are based on spatio-temporal filtering; i.e., spatial and temporal video processing are treated jointly in an integrated manner.

The methods disclosed herein are capable of spatial interpolation, i.e. upscaling, as well as temporal interpolation, i.e. frame rate conversion. Spatial and temporal interpolation can be performed separately; however, the methods disclosed herein are capable of performing both simultaneously.

The methods disclosed herein are also capable of removing many kinds of noise and artifacts and improve the video quality in many kinds of aspects. Basic noise suppression (i.e. denoising) may be significantly improved with respect to single-frame (i.e. frame-by-frame or spatial-only) approaches. The same holds for suppression of compression artifacts, such as blocking and ringing. The spatial resolution can be enhanced, resulting in improved rendition of detail and better sharpness. The methods disclosed herein are also capable of removing various kinds of temporal and motion artifacts, such as judder and temporal flickering, that are hard to remove with single-frame (spatial-only) processing without introducing blur.

The methods disclosed herein are highly adaptive to local (spatial) image structure and local (temporal) motion. The spatio-temporal filter that is utilized in the methods disclosed herein may adapt spatially in terms of local image structure and variations, while adapting temporally to local motion. This may involve a robust and accurate pre-analysis of local orientation and local motion.

Hence, a first primary unique aspect of the methods disclosed herein is: providing techniques for (spatial) orientation analysis and for computing the final spatio-temporal filter weights with reduced computational cost, while providing strong adaptivity to local orientation and motion. In part, this is achieved by decoupling the spatial and temporal aspects of the spatio-temporal filter kernel.

Another novel aspect of the methods disclosed herein relates to robustness of multi-frame processing. It can be observed that the visual quality of the spatio-temporal filtering result depends on the accuracy of the motion analysis. Furthermore, errors in motion analysis can easily result in visual artifacts and this should be prevented.

Hence, a second primary unique aspect of the methods disclosed herein is: providing a technique for robust temporal weighting, i.e. weighting samples from different frames, based on the motion analysis, as part of the spatio-temporal filter.

Another novel aspect of the methods disclosed herein relates to incorporation of a sharpening feature. Sharpening is a form of image and video enhancement, which is particularly important when doing upscaling. When performing upscaling with a basic linear filter, there is a lack of high-frequency information in the HR images (or video frames), since that information is normally not available in the LR images. Using a multi-frame and data-adaptive upscaling approach makes it possible to reconstruct and/or preserve some of the high-frequency information. Still further enhancement of this high-frequency information is needed and can be achieved by sharpening.

Hence, a third primary unique aspect of the methods disclosed herein is: providing a technique for sharpening that is integrated with the existing spatio-temporal filter.

Overview of Method for Adaptive Spatio-Temporal Filtering

FIG. 1 illustrates an overview of a method 100 for adaptive spatio-temporal filtering. The unprocessed, low-resolution, input video $y(x)$ is provided as input to the method 100 as shown at the top left. Several frames of input video pixels are buffered in a video frame memory 102, such that the pixel data from multiple frames will be available for processing. We denote the video data as a single component signal y for simplicity; however, it should be understood that the video data may consist of multiple color components, such as RGB or $YC_bC_r$. The initial stage may include other basic pre-processing, such as color conversions (e.g. from RGB to $YC_bC_r$ or extracting luminance Y), adapting bit-depth, and other operations, in preparation for the analysis and filtering stages.

We denote a pixel location in the video data by $x_i=[x_{1i}, x_{2i}, t_i]^T$ (where $x_{1i}$ and $x_{2i}$ are the spatial coordinates and $t_i$ is the temporal coordinate or frame number). Hence, $x_i$ represents a pixel location in a 3-D or spatio-temporal coordinate system; in other words, it represents any location in any of the frames in the video sequence. The pixel value at location $x_i$ is denoted by $y(x_i)$.

The main spatio-temporal filtering process 104, shown at bottom left, may include upscaling, denoising and sharpening. Pixel data from several video frames are provided to this process 104. The current frame indicates a frame with the same temporal coordinate as the output frame that is being generated at a given time. Input pixel data includes pixels $y(x_i)$ at locations that are directly aligned with locations of interest in the current frame, as well as pixels $y(x_i-m_{i,\Delta t})$ at locations that are motion-aligned with locations of interest in the current frame. That is, local motions $m_{i,\Delta t}$ are taken into account. The output of the spatio-temporal filtering process 104 is the pixel data $\hat{z}(x)$ of high-resolution, denoised, and sharpened video frames.

The spatio-temporal filtering weights are adaptively determined using analysis stages shown in the middle and right in FIG. 1. A motion estimation stage 106 determines local motion vectors $m_{i,\Delta t}$ between the current frame and other nearby frames. $\Delta t$ denotes the time offset of other frames relative to the current frame and may be −2, −1, 1, 2, for example. Motion vector data may also be buffered in memory for later use. Motion vector data is also provided to the video frame memory 102 in order to retrieve the appropriate motion-aligned pixels for other stages. We assume that the motion estimation 106 can be based on known methods, such as block-matching, gradient-based approaches, and so on.

Another stage 108 determines the values of local motion-aligned temporal confidence parameters $\rho_{i,\Delta t}$. These parameters are used in a temporal weighting scheme that is described in more detail below.

Another stage 110 determines the values of local spatial orientation parameters $\theta_i$, $\sigma_i$, and $\gamma_i$. These parameters are used in a spatial weighting scheme that is described in more detail below.

The results of the primary analysis stages 106, 108, 110 are used in a next stage 112 that adaptively determines so-called kernel weights $K_{st}$. These include both spatial and temporal components and consist of weights for pixels of multiple frames.

The final stage 114 before the main spatio-temporal filtering stage 104 takes the kernel weights as input and determines the actual filter weights $W_{st}$. This stage 114 consists mainly of an adaptive sharpening operation. The filter weights again consist of filter coefficients for pixels of multiple frames. These are then provided to the main spatio-temporal filtering stage 104.

Spatial Weighting Scheme and Determining Spatial Orientation Parameters

Figure 2:
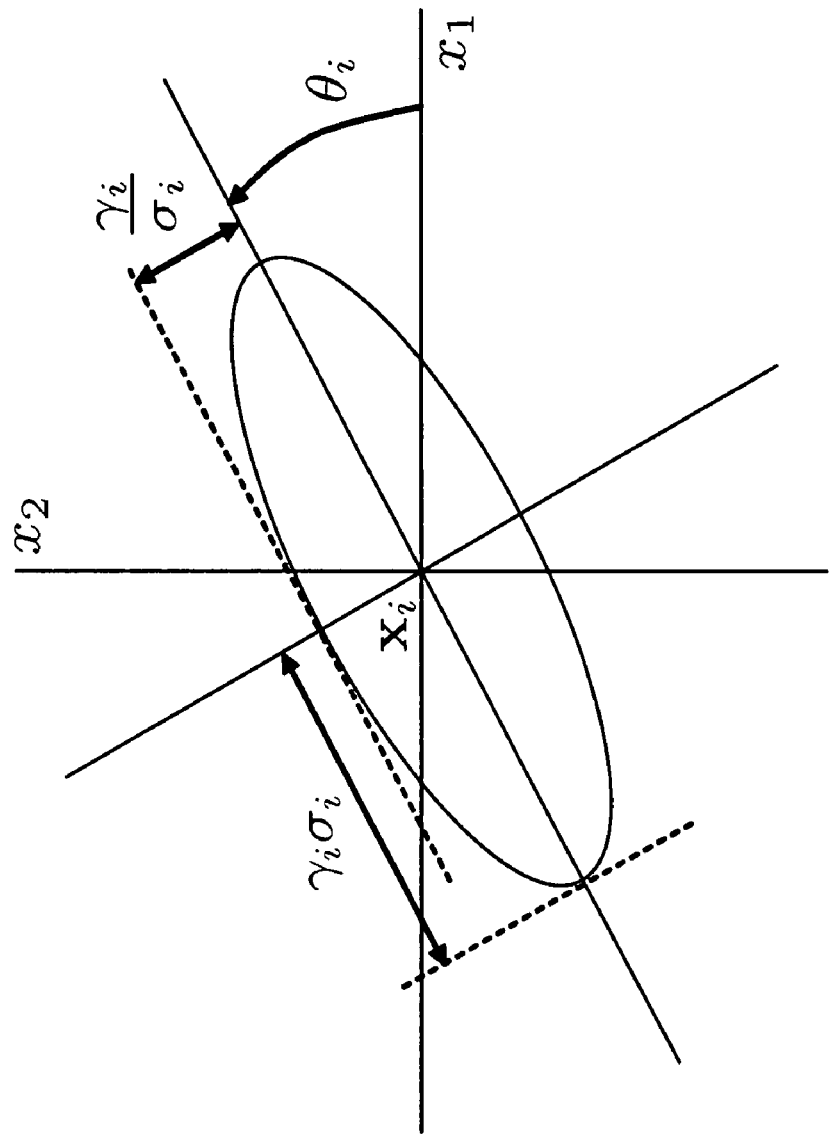
FIG. 2 illustrates a spatial weighting scheme for the spatio-temporal filter shown in FIG. 1.

The spatial weighting scheme 110 is illustrated in FIG. 2. We enable the spatio-temporal filter 104 to be adapted locally based on the following spatial orientation or steering parameters:

- an orientation angle parameter $\theta$ that determines rotation of a kernel in the spatial $(x_1, x_2)$ plane;
- an elongation parameter $\sigma$ that determines spatial elongation of a kernel along its spatial axes;
- a scaling parameter $\gamma$ that determines an overall spatial scaling.

The spatial kernel weights are determined based on the choice of prototype kernel and the steering parameters. The prototype kernel is pre-determined and may, for example, be the well-known Gaussian kernel, exponential kernel, a uniform kernel, a triangular kernel, or other existing kernel. The prototype kernel is adapted locally in each video frame using local estimates of the steering parameters, i.e. near location $x_i$, the kernel is oriented, elongated and scaled according to local steering parameters $\theta_i$, $\sigma_i$, and $\gamma_i$. To achieve the best spatial filtering performance, the steering parameters are determined based on the local variations in an image.

We aim to use a look-up table (LUT) to determine spatio-temporal kernel weights, thereby reducing processing time. To this end, we define sets of discretized parameter values, such that there is only a finite number of spatio-temporal kernels. For example, the orientation is allowed to assume a finite number of pre-determined discrete angles. For example, we may define a set of 4, 8 or 12 orientation angles. Conceptually, this corresponds to quantizing the orientation angle, such that the resulting discrete angle values can be represented by a quantization index. However, the usual process of quantizing a given "analog" value would require us to estimate the corresponding orientation parameter first and does not apply here. Instead, our goal is to directly determine the quantized/discrete values of the orientation parameters. In addition to the orientation angle, this also applies to the elongation and scaling parameter. Conceptually, we apply quantization to the orientation angle and elongation parameters jointly, corresponding to the process of vector quantization. As in the process of vector quantization, we use a nearest neighbor search to determine a single index that maps to a discrete angle and a discrete elongation value.

Figure 3:
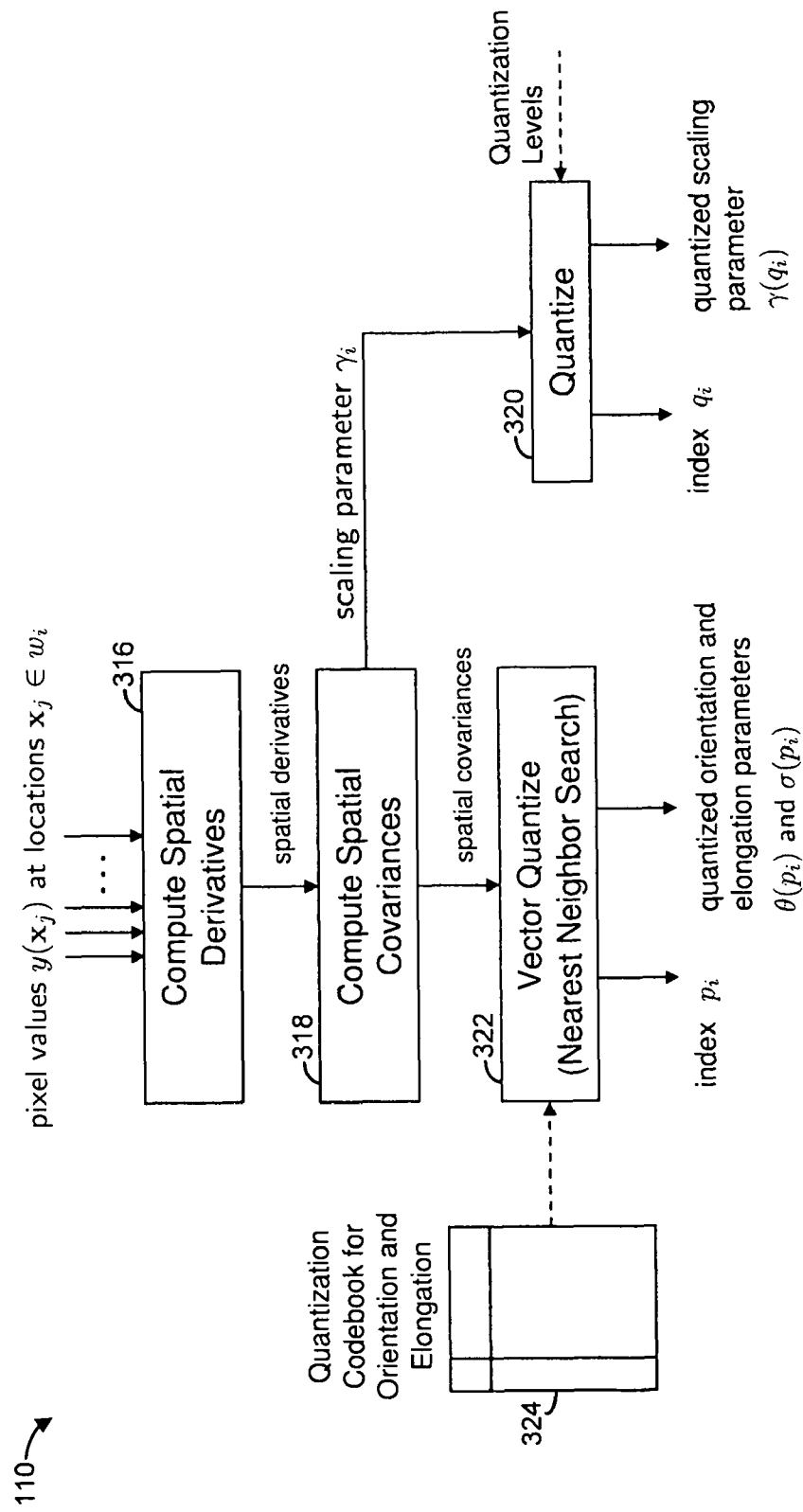
FIG. 3 illustrates a method for determining local spatial steering parameters.

The process 110 of determining local spatial steering parameters is shown in FIG. 3. Spatial orientation (or steering) parameters for the pixel at $x_i$, are determined based on a local window $w_j$ or neighborhood around $x_i$. The pixels in this window at locations $x_j \in w_i$ have pixel values $y(x_j)$. We determine the orientation parameters based on the local image gradients (horizontal and vertical spatial derivatives). Various techniques may be utilized to compute 316 the local spatial derivatives in image data. For example, one may utilize filters such as the well-known Roberts, Prewitt, and Sobel derivative operators and their variants, or derivative-of-Gaussian operators. Let us denote the computed horizontal and vertical image derivative values in the local analysis window $w_i$ by $\hat{z}_{x_1}(x_j)$, $\hat{z}_{x_2}(x_j)$, $x_j \in w_i$.

Based on the local spatial image gradients, we compute 318 the following gradient covariance or spatial structure coefficients $c_{11}, c_{12}, c_{21}$ and $c_{22}$:

$$c_{11} \equiv \sum_{x_j \in w_i} \hat{z}_{x_1}(x_j)\hat{z}_{x_1}(x_j),$$

$$c_{12} = c_{21} \equiv \sum_{x_j \in w_i} \hat{z}_{x_1}(x_j)\hat{z}_{x_2}(x_j),$$

$$c_{22} \equiv \sum_{x_j \in w_i} \hat{z}_{x_2}(x_j)\hat{z}_{x_2}(x_j).$$

We can compactly denote these coefficients grouped in a (symmetric) gradient covariance or structure matrix $C^s$:

$$C^s = \begin{bmatrix} c_{11} & c_{12} \\ c_{12} & c_{22} \end{bmatrix}.$$

Our goal is to determine the steering parameters, $\theta$, $\sigma$ and $\gamma$, directly from the coefficients $c_{11}, c_{12}$ and $c_{22}$. Our method is based on the following relation. For given values of the steering parameters ($\theta$, $\gamma$ and $\sigma$), the gradient covariance coefficients are given as follows:

$$c_{11} = \gamma(\sigma \cos^2 \theta + \sigma^{-1} \sin^2 \theta)$$

$$c_{12} = -\gamma(\sigma \cos \theta \sin \theta - \sigma^{-1} \cos \theta \sin \theta)$$

$$c_{22} = \gamma(\sigma \sin^2 \theta + \sigma^{-1} \cos^2 \theta) \qquad (1)$$

This is based on decomposing a covariance matrix into three components: rotation, elongation and scaling.

We can determine the scaling parameter $\gamma$ directly:

$$\gamma = (c_{11}c_{22} - c_{12}^2)^{1/2}.$$

We can define a normalized gradient covariance matrix $\tilde{C}^s$ with normalized gradient covariance coefficients as follows:

$$\tilde{C}^s = \begin{bmatrix} \tilde{c}_{11} & \tilde{c}_{12} \\ \tilde{c}_{12} & \tilde{c}_{22} \end{bmatrix} = \frac{1}{\gamma}\begin{bmatrix} c_{11} & c_{12} \\ c_{12} & c_{22} \end{bmatrix}$$

In general, we apply scalar quantization 320 to the scaling parameter, resulting in a quantization index q for the scaling parameter, where $1 \leq q \leq Q_1$. The number of quantization levels $Q_1$ is pre-determined. This is equivalent to having a pre-determined quantization step-size parameter. From the quantization index q for the scaling parameter, we can reconstruct a quantized value $\gamma(q)$.

Hence, given the value of a local scaling parameter at $x_i$, we can determine its quantization index, denoted by $q_i$, and its quantized value, denoted by $\gamma(q_i)$.

Suppose we pre-define combinations of quantized orientation angle values and quantized elongation values, denoted by $(\theta(p), \sigma(p))$, where $1 \leq p \leq Q_2$. Hence, we have a finite set of $Q_2$ combinations of quantized angle and elongation parameters. The quantization index p corresponds to the index into this set of combinations.

For this finite set of combinations of quantized steering parameters, we can compute the corresponding (normalized) gradient covariance coefficients using Equation 1. These combinations of values can be stored in a table 324, which is conceptually similar to the codebook in case of vector quantization. A simple example of such a codebook 424 is provided in FIG. 4. Normalized coefficients are obtained using $\gamma=1$.

We need to solve the following problem: given values of $c_{11}$, $c_{12}$ and $c_{22}$ computed from the image data, which is the best combination of quantized steering parameters $\theta(p)$ and $\sigma(p)$? We can solve this using a nearest neighbor search 322 in the codebook 324 described above. That is: we find the combination of pre-computed coefficients $c_{11}(p)$, $c_{12}(p)$ and $c_{22}(p)$ that is in some sense nearest to the image-derived values $c_{11}$, $c_{12}$ and $c_{22}$. This gives us the quantization index p for that combination of gradient covariance coefficients. And in turn this gives the best combination of quantized steering parameters $\theta(p)$ and $\sigma(p)$.

This can be denoted compactly by the following:

$$p = \underset{p}{\arg\min} D\{\tilde{C}^s, C^s(\theta(p), \sigma(p))\}. \quad (2)$$

where $\tilde{C}^s$ is a matrix with the normalized gradient covariance coefficients computed from the data, $\tilde{C}^s(\theta(p), \sigma(p))$ is a matrix with the $p^{th}$ normalized covariance coefficients determined by the pre-defined combinations of quantized steering parameters (stored in a table), and D is an appropriate distance measure. D may be the Frobenius matrix norm, corresponding to a Euclidean distance measure defined on the coefficients. This corresponds to a vector quantization process 322 applied in the space of covariance coefficients, where the pre-defined combinations of coefficients act as centroids.

Hence, given the normalized gradient covariance coefficients computed from the image data at $x_i$, we can determine 322 a vector quantization index $p_i$ that determines the quantized orientation angle $\theta(p_i)$ and elongation $\sigma(p_i)$).

We have now described how to determine (estimates of) the local steering parameters: $\gamma_i = \gamma(q_i)$, $\theta_i = \theta(p_i)$ and $\sigma_i = \sigma(p_i)$. These parameter values in turn determine the weights of a 2-D spatial steering kernel, denoted by $K_s(x_i - x; C_i^s)$, where $C_i^s$ is a compact notation for the combination of the (estimated) local spatial steering parameters. For example, if we use a Gaussian prototype kernel, then the spatial kernel weights are defined by:

$$K_s(x_i - x; C_i^s) = \frac{\det(C_i^s)}{2\pi h^s h^s} \exp\left\{-\frac{(x_i - x)^T C_i^s (x_i - x)}{2 h^s h^s}\right\}.$$

The spatial steering kernel may also be determined by a global spatial scaling parameter $h^s$. This parameter can be used to control and modulate the spatial size of the filter kernels in a global manner.

Temporal Weighting Scheme

Figure 5:
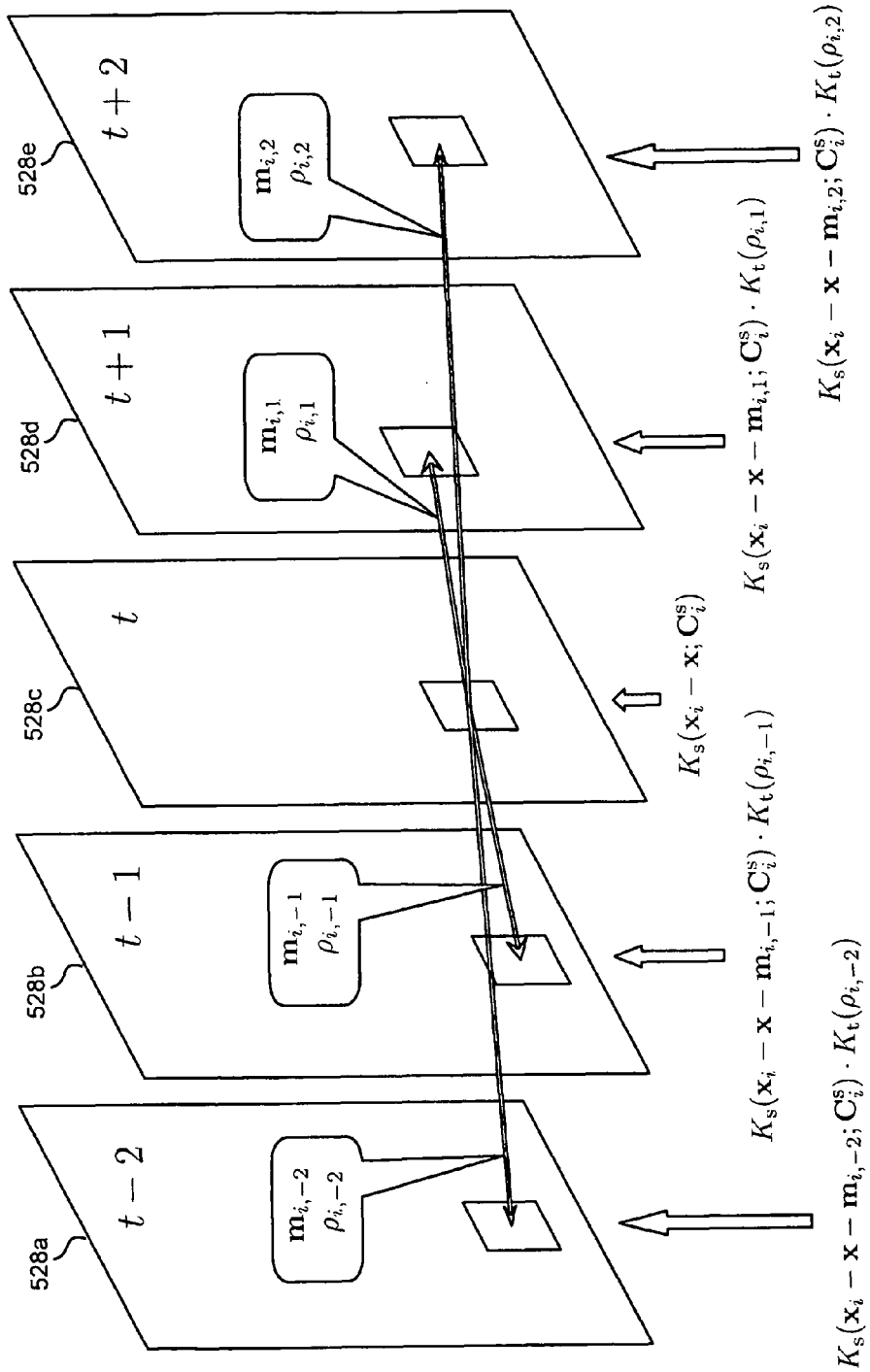
FIG. 5 illustrates a temporal weighting scheme for the spatio-temporal filter shown in FIG. 1.

The temporal weighting scheme 108 of the spatio-temporal filter 104 is illustrated in FIG. 5.

The spatio-temporal filter 104 utilizes pixel data from a number of frames 528a, 528b, 528d, 528e other than the current frame 528c. The frames 528a-e in the temporal support of the spatio-temporal filter 104 are indicated here by $\Delta t$, and for simplicity of the notation we let $\Delta t \in \{\ldots, -3, -2, -1, 0, 1, 2, 3, \ldots\}$. That is, the current frame 528c is indicated by $\Delta t=0$, the frame 528b before the current frame 528c is indicated by $\Delta t=-1$, the frame 528d following the current frame 528c is indicated by $\Delta t=1$, etc. Frames 528a, 528b, 528d, 528e other than the current frame 528c are called reference frames. In one embodiment, the temporal support is 5 frames 528 and is centered on the current frame 528c, so that we have $\Delta t \in \{-2, -1, 0, 1, 2\}$. In another embodiment, the temporal support is 3 frames 528 and is centered on the current frame 528c, so that we have $\Delta t \in \{-1, 0, 1\}$. The methods disclosed herein are not limited to a specific number of frames 528 in the temporal support, and the number of frames 528 used may be 2, 3, 4, 5, or larger. It is typically advantageous for the temporal support to include at least both the previous frame 528b as well as the following frame 528d, i.e. frames 528b, 528d in both the backward and forward temporal direction.

There are significant advantages to including reference frames 528a, 528b, 528d, 528e before as well as following the current frame 528c. In other words, the spatio-temporal filter 104 acts in a temporally bi-directional manner relative to the current frame 528c. One advantage is that the noise reduction performance improves by including frames 528a, 528b, 528d, 528e in both forward and backward temporal directions, especially near moving object boundaries in the video data. Near boundaries of moving objects, it is sometimes hard to utilize pixel data from a previous frame 528a, 528b due to occlusion effects. For example if a pixel to be predicted corresponds to an uncovered area that was not previously visible, it is hard to utilize pixel data from a previous frame 528a, 528b. Likewise, it is sometimes hard to utilize pixel data from a following frame 528d, 528e due to occlusion effects, for example if a pixel to be predicted corresponds to an area that is covered by another object in the following frame 528d, 528e. Hence, if frames 528d, 528e in only the forward direction or frames 528a, 528b in only the backward direction are utilized, the temporal filtering should be suppressed near occlusion areas. Visually, this effect becomes apparent in a spatial sense in the filtered output video, because areas near moving object boundaries still contain noise (as the temporal filter was suppressed) while other areas contain less noise (stronger temporally filtered). However, by including frames 528*a*, 528*b*, 528*d*, 528*e* in both the forward and backward temporal directions, it is often possible to utilize suitable pixel data in frames 528 in the temporal support, even in areas of occlusion such as near moving object boundaries. This avoids a significant suppression of the temporal filter strength near moving object boundaries.

Another advantage of including reference frames 528*a*, 528*b*, 528*d*, 528*e* in the forward and backward temporal direction is apparent near scene changes, shot boundaries, or other abrupt temporal changes in the video sequence. A video frame 528 right after a scene change will contain significantly different content from a video frame 528 right before the scene change. Hence, the temporal filtering strength should be suppressed, if the temporal support only includes previous frames 528*a*, 528*b*. This may lead to a visual change in the amount of noise in the filtered output video in the temporal sense. Likewise, the problem would occur in frames 528 prior to the scene change, if the temporal support only includes frames 528*d*, 528*e* following the current frame 528*c*. However, the problem can be avoided by including both previous frames 528*a*, 528*b* and following frames 528*d*, 528*e*.

We will describe a mechanism to adapt the weights, and hence the strength, of the temporal portion in our spatio-temporal filter 104, such that effects due to object occlusions, scene changes, and other phenomena, can be handled automatically.

We enable the spatio-temporal filter 104 to be adapted locally based on the spatial steering parameters as described above as well as the following temporal steering parameters:

local motion vectors or optical flow vectors $$m_{i,\Delta t} = \begin{bmatrix} m_{1i,\Delta t} \\ m_{2i,\Delta t} \\ 1 \end{bmatrix},$$

local motion-aligned temporal confidence parameters $\rho_{i,\Delta t}$.

In the methods disclosed herein, we allow multiple motion vectors $m_{i,\Delta t}$ at a location $x_i$, one for each frame 528 in the temporal support of the spatio-temporal filter 104. For example, the motion vector from the current frame 528*c* to the previous frame 528*b* is indicated by $m_{i,-1}$, and the motion vector from the current frame 528*c* to the next frame 528*d* is indicated by $m_{i,1}$. We also let $m_{i,\Delta t}$ denote the displacement vector, which defines the resulting displacements in terms of pixels associated with the motion vector. The motion vector and displacement vector can be considered equivalent for our purposes. We use the term motion vector and displacement vector interchangeably.

The effect of the motion/displacement vector on the spatial weights is to shift or translate the spatial kernel weights in frames $\Delta t$ by the appropriate estimated motion vector:

$$K_s(x_i-x-m_{i,\Delta t}; C_i^s)$$

Hence, the spatio-temporal kernel is motion-aligned. This is similar to motion compensation; however, an explicit motion compensation step is avoided. Explicit motion compensation may require intermediate interpolation and rounding steps that may degrade the filtered output video. Instead, in the methods disclosed herein, we utilize motion-compensated or motion-aligned filtering. Note that for pixels in the current frame 528*c*, the displacement vector $m_{i,\Delta t}$ is always $[0, 0, 0]^T$ by definition. For pixels in other frames $\Delta t$ (within the spatial and temporal support), $m_{i,\Delta t}$ denotes the estimated local displacement vector between the current frame 528*c* and frame $\Delta t$ (likewise for the corresponding motion-aligned temporal confidence parameter).

We assume that the local motion vectors (or displacement vectors) can be estimated 106 using existing motion estimation methods, for example well-known block-matching or gradient-based methods. The motion vectors may be determined 106 on a pixel-by-pixel basis or on a block-by-block basis. Our temporal weighting scheme is not limited to either pixel-by-pixel or block-by-block motion vectors.

We describe the role of the motion-aligned temporal confidence parameter $\rho$ next. The role of the $\rho$ parameter should be to indicate the "usability" or "fitness" of pixels/samples in reference frames 528*a*, 528*b*, 528*d*, 528*e* for the purpose of estimating pixels/samples in the current frame 528*c*. For example, we may try to estimate the pixel value at location $x_i$ in the current frame 528*c* using spatio-temporal filtering. The motion estimation process 106 provides us with locations in the reference frames 528*a*, 528*b*, 528*d*, 528*e* where candidate pixels may be found that are likely to be useful in the estimation/filtering process 104. For example, the pixel at $x_i - m_{i,-1}$ in the previous frame 528*b*, and the pixel at $x_i - m_{i,1}$ in the next frame 528*d*. However, the motion estimation 106 may have resulted in motion vectors that are inaccurate or otherwise in error. For example, a motion vector may be inaccurate due to noise. In other cases, it is simply not possible to estimate a proper motion vector, e.g. due to object occlusion. Motion estimation 106 in itself inherently is a complex process, and its implementation may be subject to various trade-offs. Since motion vectors can be imperfect, a mechanism is needed to prevent imperfect motion vectors from impacting the final estimation/filtering result. Furthermore, temporal changes can occur in a video sequence that cannot be modeled well by the concept of motion. What is needed is a measure of confidence indicating the fitness of candidate motion-aligned or motion-compensated pixel values in reference frames 528*a*, 528*b*, 528*d*, 528*e* for reconstructing pixels in the current frame 528*c*.

Figure 6:
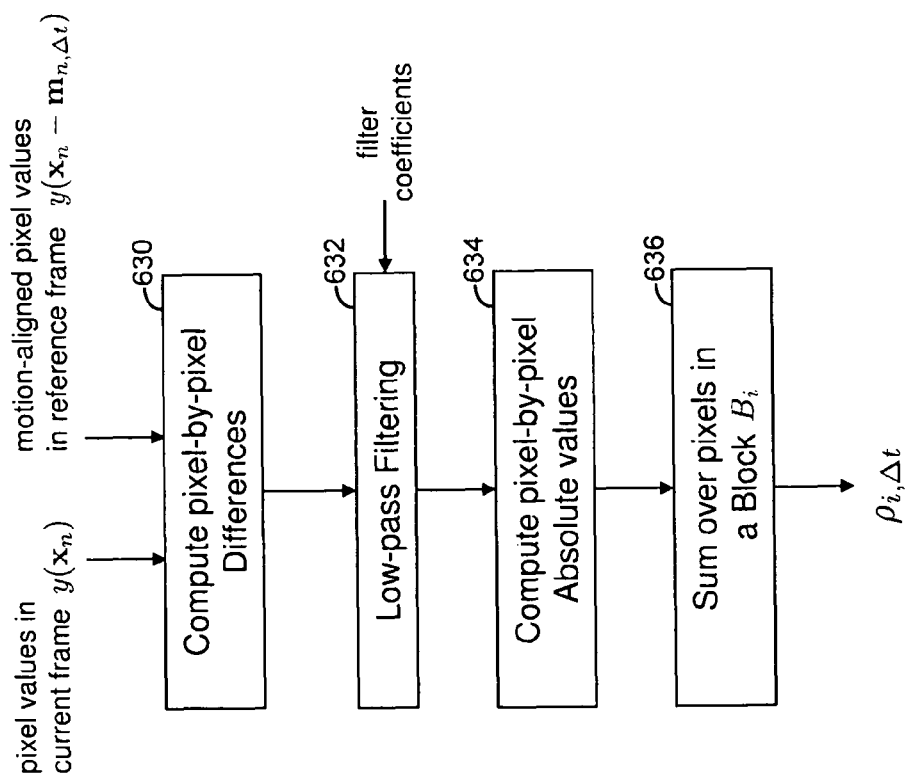
FIG. 6 illustrates a method for assessing the suitability of candidate pixels in reference video frames.

A direct technique to assess the "fitness" of candidate pixels in reference frames 528*a*, 528*b*, 528*d*, 528*e* is to compute their similarity or correlation to the pixel(s) in the current frame 528*c* that is being estimated. Reference is now made to FIG. 6. The similarity or correlation measure may be based on pixel value differences 630. For example, we may define $\rho_{i,\Delta t}$ based on the difference between a pixel $y(x_i)$ in the current frame 528*c* and the corresponding pixel $y(x_i - m_{i,\Delta t})$ in a reference frame 528*a*, 528*b*, 528*d*, 528*e*, using the computed motion vector $m_{i,\Delta t}$, as follows:

$$\rho_{i,\Delta t} = |y(x_i) - y(x_i m_{i,\Delta t})|. \tag{3}$$

Also, we may define $\rho_{i,\Delta t}$ based on the differences between a block of pixels $B_i$ in the current frame 528*c*, $\{y(x_n)|x_n \in B_i\}$, and the corresponding block of pixels in a reference frame 528*a*, 528*b*, 528*c*, 528*d*, $\{y(x_n - m_{n,\Delta t})|x_n \in B_i\}$. Note that when using a block-based motion estimation technique, all pixels in a block may share the same motion vector. A block-based difference measure may be based on the sum 636 of absolute differences 634:

$$\rho_{i,\Delta t} = \frac{1}{N} \sum_{x_n \in B_i} |y(x_n) - y(x_n - m_{n,\Delta t})|, \tag{4}$$

or on the sum of squared differences:

$$\rho_{i,\Delta t} = \left( \frac{1}{N} \sum_{x_n \in B_i} |y(x_n) - y(x_n - m_{n,\Delta t})|^2 \right)^{1/2}. \tag{5}$$

The above pixel difference measures may be based on the input pixel values $y(x_i)$. However, in this case the difference measures may be impacted by non-structural differences such as noise and aliasing. This would be undesirable, since our goal is to utilize temporal filtering with significant weight given to pixel values from multiple frames 528 to suppress noise and aliasing. One technique to reduce the impact of noise and aliasing on the difference measures is to apply pre-smoothing or low-pass filtering 632 on the input pixel values, i.e. a low-pass filter f may be applied to pixel values y. This corresponds to replacing y in Equations 3-5 by f*y. Also, as shown in FIG. 6, the low-pass filter f 632 may be applied after computing motion-aligned differences 630 (and before taking the absolute values 634), for example:

$$\rho_{i,\Delta t} = \frac{1}{N} \sum_{x_n \in B_i} |f * (y(x_n) - y(x_n - m_{n,\Delta t}))|. \qquad (6)$$

The pre-smoothing filter f can be a simple low-pass filter, such as the well-known box filter, Gaussian filter, or other filter. This significantly improves the performance of the confidence or fitness measure ρ, because the effect of noise and aliasing has been reduced. In turn, this technique improves the visual quality of the spatio-temporally filtered output video.

The above difference measures can also be extended easily from using pixel graylevel values to pixel color values, in any suitable color space, such as RGB or $YC_bC_r$.

The final temporal weighting is determined by applying the temporal kernel $K_t(\cdot)$ to the values $\rho_{i,\Delta t}$. Using a Gaussian kernel, the temporal weights are as follows:

$$K_t(\rho_{i,\Delta t}) = \exp\left(-\frac{1}{2}\left(\frac{\rho_{i,\Delta t}}{h^t}\right)^2\right),$$

where $h_t$ is the global temporal scaling parameter. This parameter may be a global constant, or may be adapted to the video data, e.g. on a frame-by-frame or block-by-block basis.

Determining Filter Kernel Weights

Figure 7:
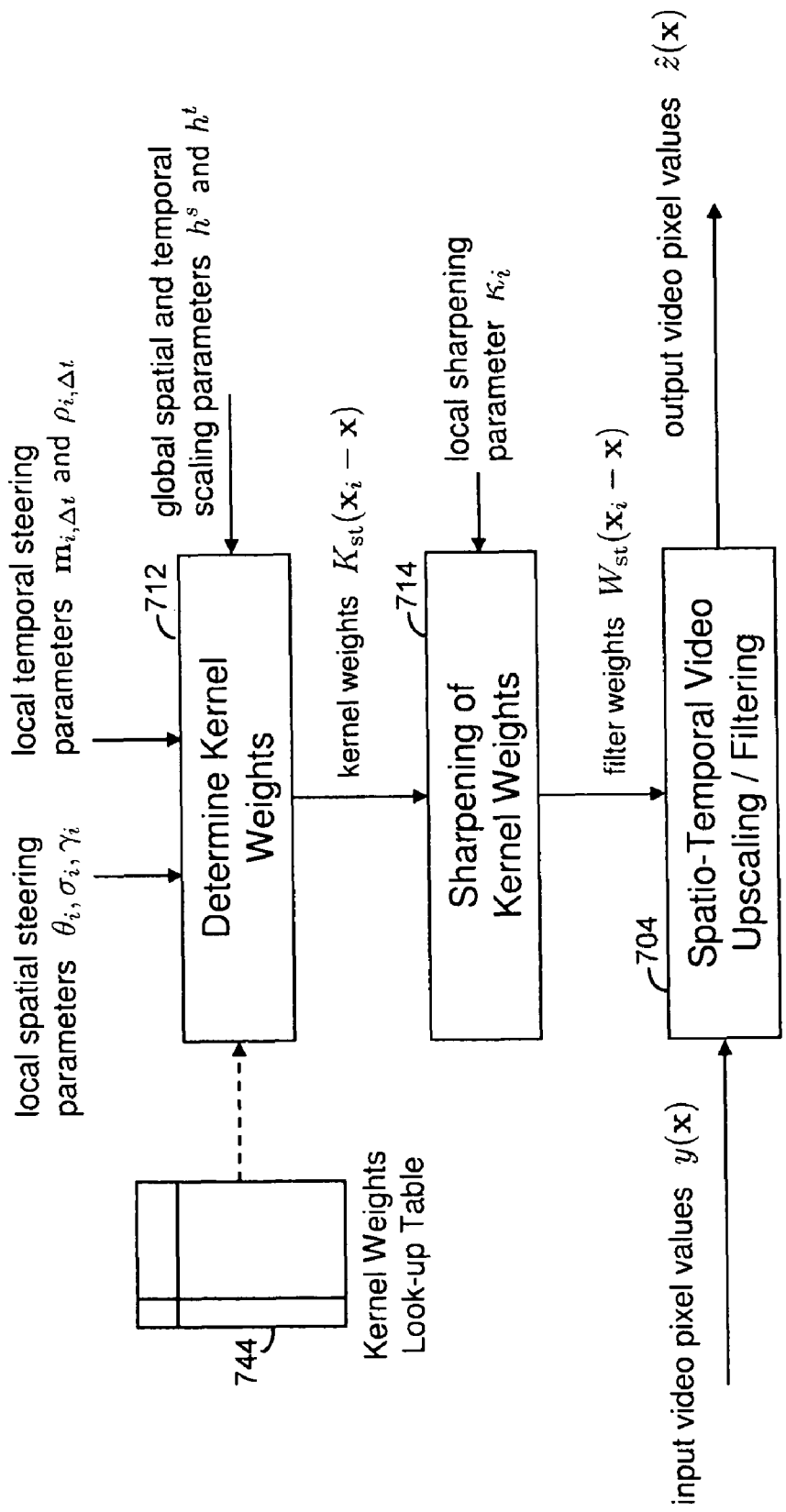
FIG. 7 illustrates a method for determining filter kernel weights for the spatio-temporal filter shown in FIG. 1.

The process of determining filter kernel weights is shown in FIG. 7.

In the following, we assume we have available estimates of the local spatial steering parameters $\theta_i$, $\sigma_i$, $\gamma_i$ and local temporal steering parameters $m_{i,\Delta t}$ and $\rho_{i,\Delta t}$. We also assume that there is a pre-defined finite set of possible values for each parameter. For example, the spatial steering parameters may be determined using the process described above. As another example, motion vectors are in some cases estimated with a finite accuracy, and otherwise a simple quantization step can be applied, with a suitable accuracy.

Furthermore, we assume we also have available global spatial and temporal scaling parameters $h^s$ and $h^t$. These parameters can be used to control and modulate the scale of the filter kernels in a global manner.

In a first step 712, we define 3-D spatio-temporal kernel weights $K_{st}$ based on a 2-D spatial kernel $K_s$ and a 1-D temporal kernel $K_t$, given the (local and global) steering parameters:

$$K_{st}(x_i-x) = K_s(x_i-x-m_{i,\Delta t}; C_i^s) \cdot K_t(\rho_{i,\Delta t}) \qquad (7)$$

These are the kernel weights for all the frames 528 in the temporal support of the spatio-temporal filter 104. The spatial and temporal weighting schemes are described in more detail above.

The spatial kernel weights $K_s$ and temporal kernel weights $K_t$ can simply be obtained using a look-up table (LUT) 744. That is, kernel weights for the finite sets of quantized steering parameters can be pre-determined and stored in a look-up table 744. We can simply retrieve the appropriate weight values given the steering parameters when needed. Note that the spatial steering parameters may be determined only on the current frame 528c for computational simplicity. For further computational simplification, the spatial steering parameters may be determined only on one of the pixels $x_i$ (typically the pixel closest to the pixel being estimated).

In a second step, we apply sharpening 714 to the kernel weights. This process of "sharpening" 714 the kernel weights will eventually lead to a sharpening effect in the final filtered video frames. The sharpening step 714 is achieved by convolving the kernel weights with a Laplacian kernel L, multiplying the result by a sharpening factor κ, and adding the result to the original kernel weights. This can be described by:

$$W_{st} = K_s + \kappa L * K_{st}.$$

$W_{st}(x_i-x)$ denotes the final spatio-temporal filter weights. The Laplacian kernel can be a well-known digital approximation of the Laplacian operator, or e.g. it may be a Laplacian-of-Gaussian filter. Another approach to forming the second term would be to use a Gaussian filter combined with subtraction. It can be shown that the above sharpening step 714 results in filter weights that approximate weights generated by use of 2nd-order kernel regression.

It is desirable to select the sharpening factor κ adaptively in order to sharpen details while avoiding noise amplification. Less sharpening is needed in flat regions of the image, while more sharpening can be used in areas with texture and edges. Hence, we may choose the sharpening factor locally, based on the local image structure. We can select the local sharpening factor $\kappa_i$ based on the local spatial scaling parameter $\gamma_i$, which is large when there is significant local image structure and small when there is no interesting structure. Alternatively, we can select the sharpening factor based on the strength of the local image gradients, which are large in areas of edges and texture. Hence, a simple mechanism to choose $\kappa_i$ is as follows:

$$\kappa_i = g(\gamma_i)^\eta,$$

or alternatively:

$$\kappa_i = g(\text{trace}(C_i^s))^\eta.$$

Here g is a global sharpening factor, and η is a sensitivity parameter ($0 \leq \eta \leq 1.0$). The global sharpening factor g may be chosen differently for luminance and chrominance components, hence $g \equiv g_Y$ for luminance and $g \equiv g_C$ for chrominance.

The actual spatio-temporal upscaling and filtering stage 704 can be expressed as:

$$\hat{z}(x) = \sum_{i=1}^{P} W_{st}(x_i - x) y(x_i). \qquad (8)$$

It is understood that spatio-temporal processing can be performed either in a pixel-based, block-based, or frame-based manner. That is, several of the stages described above can be performed in a pixel-by-pixel manner, block-by-block manner, or by processing an entire frame at each stage. For example, determining the spatial steering parameters, determining the temporal confidence parameters, determining the spatio-temporal kernel weights, and performing the spatio-temporal filtering, may all be performed for all the pixels in a single image block, after which the next block of pixels will be processed. Block-based processing is often advantageous in order to keep the required memory and processing resources low.

Figure 8:
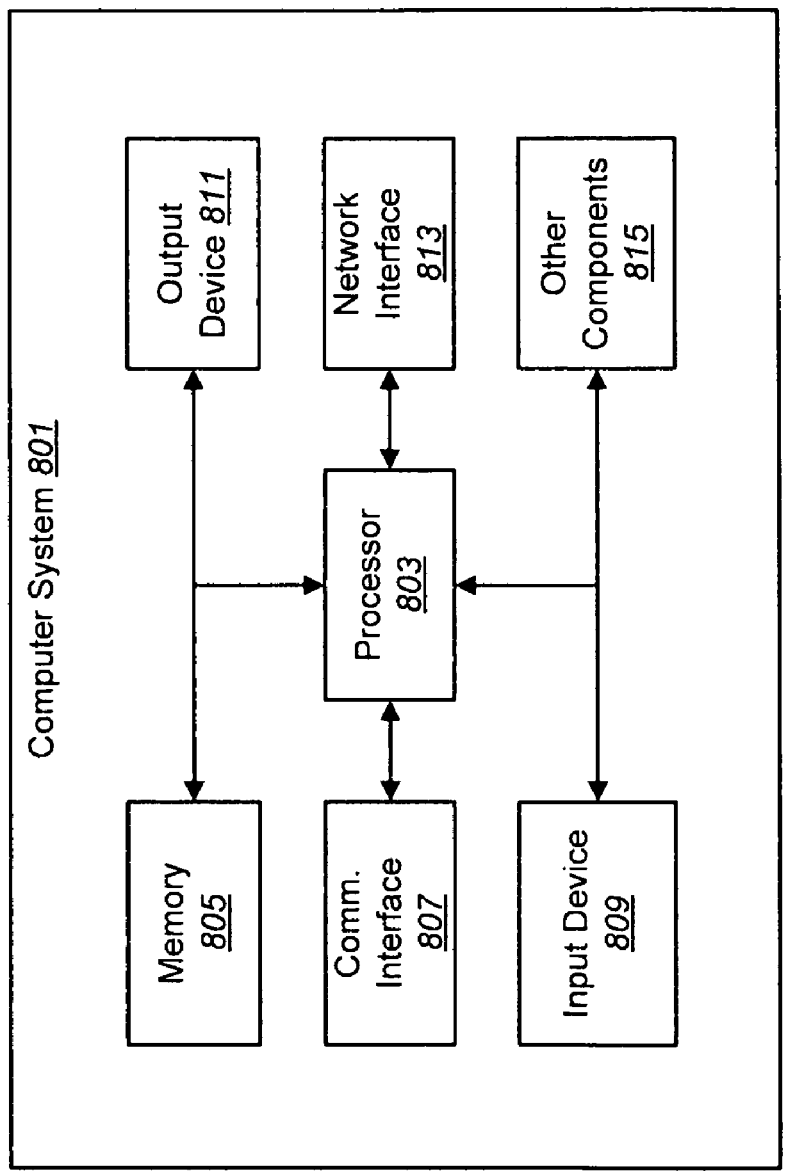
FIG. 8 illustrates various components that may be utilized in a computing device.

FIG. 8 illustrates various components that may be utilized in a computer system 801. One or more computer systems 801 may be used to implement the various systems and methods disclosed herein. The illustrated components may be located within the same physical structure or in separate housings or structures. Thus, the term computer or computer system 801 is used to mean one or more broadly defined computing devices unless it is expressly stated otherwise. Computing devices include the broad range of digital computers including microcontrollers, hand-held computers, personal computers, servers, mainframes, supercomputers, minicomputers, workstations, and any variation or related device thereof.

The computer system 801 is shown with a processor 803 and memory 805. The processor 803 may control the operation of the computer system 801 and may be embodied as a microprocessor, a microcontroller, a digital signal processor (DSP) or other device known in the art. The processor 803 typically performs logical and arithmetic operations based on program instructions stored within the memory 805. The instructions in the memory 805 may be executable to implement the methods described herein.

The computer system 801 may also include one or more communication interfaces 807 and/or network interfaces 813 for communicating with other electronic devices. The communication interface(s) 807 and the network interface(s) 813 may be based on wired communication technology, wireless communication technology, or both.

The computer system 801 may also include one or more input devices 809 and one or more output devices 811. The input devices 809 and output devices 811 may facilitate user input. Other components 815 may also be provided as part of the computer system 801.

FIG. 8 illustrates only one possible configuration of a computer system 801. Various other architectures and components may be utilized.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for adaptive spatio-temporal filtering, comprising:
    determining local motion vectors between a current video frame and other nearby video frames;
    determining local temporal confidence parameters;
    determining local spatial steering parameters;
    using the local motion vectors, the local temporal confidence parameters, and the local spatial steering parameters to adaptively determine spatio-temporal kernel weights, wherein adaptively determining the spatio-temporal kernel weights comprises defining three-dimensional spatio-temporal kernel weights based on a two-dimensional spatial kernel and a one-dimensional temporal kernel; and
    using the spatio-temporal kernel weights to perform spatio-temporal filtering on input video data.

2. The method of claim 1, wherein the spatio-temporal filtering comprises at least one of upscaling, denoising, and sharpening.

3. The method of claim 1, further comprising defining sets of discretized parameter values, wherein the local motion vectors, the local temporal confidence parameters, and the local spatial steering parameters are determined from the sets of discretized parameter values.

4. The method of claim 1, wherein the spatio-temporal kernel weights are determined from a look-up table.

5. The method of claim 1, wherein the local spatial steering parameters comprise a scaling parameter, and wherein determining the scaling parameter comprises:
   determining local spatial image gradients based on the current video frame;
   determining gradient covariance coefficients based on the local spatial image gradients;
   determining the scaling parameter from the gradient covariance coefficients; and
   applying scalar quantization to the scaling parameter.

6. The method of claim 1, wherein the local spatial steering parameters comprise an orientation angle parameter and an elongation parameter, and wherein determining the orientation angle parameter and the elongation parameter comprises:
   defining combinations of quantized orientation angle parameters and quantized elongation parameters;
   determining gradient covariance coefficients for the combinations of quantized orientation angle parameters and quantized elongation parameters;
   determining local spatial image gradients based on a current video frame;
   determining gradient covariance coefficients based on the local spatial image gradients; and
   determining a combination of a quantized orientation angle parameter and a quantized elongation parameter whose gradient covariance coefficients are nearest to the image-derived gradient covariance coefficients.

7. The method of claim 1, wherein determining the local temporal confidence parameters comprises determining the correlation between candidate pixels in reference video frames and pixels that are being estimated in the current video frame.

8. The method of claim 7, wherein determining the local temporal confidence parameters further comprises applying a pre-smoothing filter.

9. The method of claim 1, further comprising modifying the spatio-temporal kernel weights.

10. The method of claim 9, wherein modifying the spatio-temporal kernel weights comprises sharpening the spatio-temporal kernel weights, and wherein sharpening the spatio-temporal kernel weights comprises:
    convolving the spatio-temporal kernel weights with a kernel;
    multiplying the result of the convolution operation by a sharpening factor; and
    adding the result of the multiplication operation to the original spatio-temporal kernel weights.

11. The method of claim 10, wherein the sharpening factor is selected based on local image gradients.

12. The method of claim 1, wherein the nearby video frames comprise reference video frames that are temporally positioned before as well as following the current video frame.

13. The method of claim 1, wherein processing is performed in a block-based manner.

14. A computer system that is configured to perform adaptive spatio-temporal filtering, comprising:
    a processor;
    memory in electronic communication with the processor;
    instructions stored in the memory, the instructions being executable to:
      determine local motion vectors between a current video frame and other nearby video frames;
      determine local temporal confidence parameters;
      determine local spatial steering parameters;
      use the local motion vectors, the local temporal confidence parameters, and the local spatial steering parameters to adaptively determine spatio-temporal kernel weights, wherein adaptively determining the spatio-temporal kernel weights comprises defining three-dimensional spatio-temporal kernel weights based on a two-dimensional spatial kernel and a one-dimensional temporal kernel; and
      use the spatio-temporal kernel weights to perform spatio-temporal filtering on input video data.

15. The computer system of claim 14, further comprising instructions executable to define sets of discretized parameter values, wherein the local motion vectors, the local temporal confidence parameters, and the local spatial steering parameters are determined from the sets of discretized parameter values.

16. The computer system of claim 14, further comprising instructions executable to sharpen the spatio-temporal kernel weights.

17. A non-transitory computer-readable storage medium comprising instructions that, when executed by a processor, cause a computing device to:
    determine local motion vectors between a current video frame and other nearby video frames;
    determine local temporal confidence parameters;
    determine local spatial steering parameters;
    use the local motion vectors, the local temporal confidence parameters, and the local spatial steering parameters to adaptively determine spatio-temporal kernel weights, wherein adaptively determining the spatio-temporal kernel weights comprises defining three-dimensional spatio-temporal kernel weights based on a two-dimensional spatial kernel and a one-dimensional temporal kernel; and
    use the spatio-temporal kernel weights to perform spatio-temporal filtering on input video data.

18. The computer-readable storage medium of claim 17, further comprising instructions that, when executed by the processor, cause the computing device to define sets of discretized parameter values, wherein the local motion vectors, the local temporal confidence parameters, and the local spatial steering parameters are determined from the sets of discretized parameter values.

19. The computer-readable storage medium of claim 17, further comprising instructions that, when executed by the processor, cause the computing device to sharpen the spatio-temporal kernel weights.

* * * * *